(12) United States Patent
Cupit

(10) Patent No.: US 11,291,933 B2
(45) Date of Patent: *Apr. 5, 2022

(54) FILTERS

(71) Applicant: ICON TECHNOLOGY SYSTEMS LIMITED, Dunchurch (GB)

(72) Inventor: David Cupit, Dunchurch (GB)

(73) Assignee: ICON TECHNOLOGY SYSTEMS LIMITED, Dunchurch (GB)

( * ) Notice: Subject to any disclaimer, the term of this patent is extended or adjusted under 35 U.S.C. 154(b) by 0 days.

This patent is subject to a terminal disclaimer.

(21) Appl. No.: 16/532,326

(22) Filed: Aug. 5, 2019

(65) Prior Publication Data

US 2020/0206656 A1 Jul. 2, 2020

Related U.S. Application Data

(62) Division of application No. 15/598,230, filed on May 17, 2017, now abandoned, which is a division of
(Continued)

(30) Foreign Application Priority Data

Feb. 18, 2010 (GB) ..................................... 1002771

(51) Int. Cl.
*B01D 27/08* (2006.01)
*B01D 29/15* (2006.01)
(Continued)

(52) U.S. Cl.
CPC ............. *B01D 27/08* (2013.01); *B01D 29/15* (2013.01); *B01D 29/96* (2013.01); *B01D 35/30* (2013.01);
(Continued)

(58) Field of Classification Search
CPC ........ B01D 27/00; B01D 27/08; B01D 29/01; B01D 29/014; B01D 29/035; B01D 29/11;
(Continued)

(56) References Cited

U.S. PATENT DOCUMENTS 3,266,628 A * 8/1966 Price ...................... B01D 27/02
210/94
3,542,202 A * 11/1970 Ball ...................... B01D 29/00
210/232

(Continued)

FOREIGN PATENT DOCUMENTS

CN 1202837 A 12/1998
CN 101553432 A 10/2009
(Continued)

OTHER PUBLICATIONS

International Bureau of WIPO, PCT International Search Report and Written Opinion for PCT Counterpart Application No. PCT/GB2011/050095 containing Communication relating to the Results of the International Search Report, 18 pgs., (dated Oct. 18, 2011).
(Continued)

*Primary Examiner* — Joseph W Drodge
(74) *Attorney, Agent, or Firm* — Womble Bond Dickinson (US) LLP

(57) ABSTRACT

A filter insert (10) comprising: a body portion (12) and a closed-ended tube (14), an open end of which is sealingly affixed around the periphery of the body portion (12); an inlet aperture (16) and an outlet aperture (18) each aperture communicating via a through hole in the body portion (12) with the interior of the tube (14); a filter medium (20) located within the tube (14) and being sealingly interposed between the inlet aperture (16) and the outlet aperture (18), wherein the tube (14) is at least partially manufactured of a
(Continued)

flexible plastics material, and wherein the body portion (12) is relatively rigid.

13 Claims, 8 Drawing Sheets

Related U.S. Application Data application No. 13/579,922, filed as application No. PCT/GB2011/050095 on Jan. 20, 2011, now Pat. No. 9,662,598.

(51) Int. Cl.
*B01D 29/96* (2006.01)
*C02F 1/28* (2006.01)
*C02F 1/42* (2006.01)
*B01D 35/30* (2006.01)

(52) U.S. Cl.
CPC ............... *B01D 2201/307* (2013.01); *B01D 2201/4015* (2013.01); *B01D 2201/4023* (2013.01); *B01D 2201/4046* (2013.01); *C02F 1/283* (2013.01); *C02F 1/42* (2013.01); *C02F 2201/006* (2013.01)

(58) Field of Classification Search
CPC .. B01D 29/114; B01D 29/15; B01D 29/0029; B01D 29/0043; B01D 29/0097; B01D 29/009515; B01D 29/96; B01D 35/30; B01D 35/306; B01D 35/308; B01D 35/31; B01D 35/34; B01D 2201/307; B01D 2201/4015; B01D 2201/4023; B01D 2201/4046; C02F 1/001; C02F 1/003; C02F 1/283; C02F 1/42; C02F 2201/006
USPC ....... 210/232, 264, 282, 287, 418, 443, 437, 210/438, 440, 450, 459, 460, 497.01
See application file for complete search history.

(56) References Cited

U.S. PATENT DOCUMENTS

| | | | |
|---|---|---|---|
| 4,443,336 A | 4/1984 | Bennethum | |
| 4,666,600 A | 5/1987 | Hankammer | |
| 4,711,717 A * | 12/1987 | Wolf ...................... | B01D 35/30 210/137 |
| 4,735,288 A | 4/1988 | Uematsu | |
| 4,842,737 A * | 6/1989 | Reed ...................... | B01D 35/30 210/321.87 |
| 4,857,191 A | 8/1989 | Wolf | |
| 4,871,455 A | 10/1989 | Terhune | |
| 4,882,051 A | 11/1989 | Itoh | |
| 4,904,382 A | 2/1990 | Thomsen | |
| 4,929,352 A | 5/1990 | Wolf | |
| 5,026,478 A * | 6/1991 | Tanabe ................... | B01D 27/08 210/232 |
| 5,045,192 A | 9/1991 | Terhune | |
| 5,092,993 A | 3/1992 | Goodwin | |
| 5,164,082 A * | 11/1992 | Lin ......................... | B01D 29/15 210/238 |
| 5,256,285 A | 10/1993 | Tomita et al. | |
| 5,273,649 A * | 12/1993 | Magnusson ............. | C02F 1/002 210/232 |
| 5,284,582 A * | 2/1994 | Yang ....................... | B01D 35/04 210/136 |
| 5,336,406 A | 8/1994 | Stanford | |
| 5,364,528 A * | 11/1994 | Schwarz ............... | B01D 29/114 210/323.2 |
| 5,593,570 A * | 1/1997 | Habib .................... | B01J 29/146 208/108 |
| 5,595,582 A | 1/1997 | Junker | |
| 5,688,396 A | 11/1997 | Baumann | |
| 5,770,066 A * | 6/1998 | Coates .................. | B01D 29/114 210/232 |
| 6,238,552 B1* | 5/2001 | Shannon ................. | C02F 1/003 210/282 |
| 6,533,931 B1* | 3/2003 | Reid ....................... | B01D 35/31 210/232 |
| 6,630,068 B1 | 10/2003 | Vinci | |
| 8,673,146 B2 | 3/2014 | Huda | |
| 9,662,598 B2* | 5/2017 | Cupit ..................... | B01D 27/08 |
| 2003/0010721 A1 | 1/2003 | Aldred et al. | |
| 2003/0070968 A1* | 4/2003 | Haynes .................. | B01D 35/31 210/87 |
| 2003/0213736 A1 | 11/2003 | Hiranaga et al. | |
| 2004/0016687 A1 | 1/2004 | Jainek | |
| 2004/0020837 A1* | 2/2004 | Reid ....................... | B01D 35/31 210/232 |
| 2005/0236316 A1 | 10/2005 | Gould et al. | |
| 2006/0037906 A1 | 2/2006 | Assion | |
| 2006/0151379 A1* | 7/2006 | Fobe ..................... | B01D 29/111 210/418 |
| 2006/0186031 A1 | 8/2006 | Fick | |
| 2007/0232425 A1 | 10/2007 | Ichida | |
| 2008/0164188 A1 | 7/2008 | Jensen et al. | |
| 2008/0203010 A1* | 8/2008 | Kraft ...................... | B01D 35/30 210/443 |
| 2008/0245719 A1* | 10/2008 | Beard ..................... | A47J 31/02 99/323 |
| 2009/0078626 A1 | 3/2009 | Krull et al. | |
| 2009/0101554 A1 | 4/2009 | Kreiner et al. | |
| 2009/0199272 A1 | 8/2009 | Gopalakrishna | |
| 2009/0199722 A1* | 8/2009 | Bodum ................... | A47J 31/02 99/323 |
| 2010/0032359 A1 | 2/2010 | Gillenberg | |
| 2012/0144854 A1 | 6/2012 | Huda et al. | |
| 2012/0156748 A1* | 6/2012 | Bos .......................... | C08H 8/00 435/165 |
| 2016/0312249 A1* | 10/2016 | Foody ............ | C12Y 302/01004 |

FOREIGN PATENT DOCUMENTS

| | | |
|---|---|---|
| CN | 104709958 A | 6/2015 |
| DE | 197 07 132 AI | 8/1998 |
| EP | 1 222 951 AI | 7/2002 |
| WO | WO 2001/005485 | 1/2001 |
| WO | WO 2007/012079 | 1/2007 |
| WO | WO 2007/029243 | 3/2007 |
| WO | WO 2009/051757 | 4/2009 |

OTHER PUBLICATIONS

IP Office of the UK, Patents Act 1977: Search Report under Section 17(5) for Great Britain counterpart Great Britain Application No. GB1002771.2, 3 pgs., (dated Jun. 17, 2010).

International Bureau of WIPO, PCT International Preliminary Report on Patentability (Chapter I of the Patent Cooperation Treaty) for counterpart International Application No. PCT/GB2011/050095, 12 pp., (dated December 4, 2013).

* cited by examiner

FILTERS

CROSS-REFERENCE TO RELATED APPLICATIONS

This application is a divisional of U.S. application Ser. No. 15/598,230, filed 17 May 2017 and still pending, which in turn is a divisional of U.S. application Ser. No. 13/579,922, filed 29 Nov. 2012 and now U.S. Pat. No. 9,662,598, which in turn is a U.S. National Phase Application under 35 U.S.C. § 371 of PCT Application No. PCT/GB2011/050095, filed 20 Jan. 2011, entitled FILTERS, which in turn claims priority to Great Britain Application No. 1002771.2, filed 18 Feb. 2010.

FIELD

This invention relates to filters, and in particular, but without limitation to, canister-type, in-line filters. The invention is particularly applicable to the field of water, and potable water, filtration.

BACKGROUND

Filters, and in particular, water filters, are widely used in domestic and commercial settings to filter out impurities in fluids, such as potable water, body fluids, e.g. blood, chemicals and/or water used in high-cleanliness applications e.g. medical applications. Depending on how much fluid or water is needed, and/or whether the fluid or water is supplied from a mains supply or a tank, the fluid can either be filtered batch-wise, or continuously.

In situations where a large volume of fluid needs to be filtered, or where the fluid flow rate is relatively high, it is often more convenient to use a plumbed-in, continuous filtration system. Such systems are relatively well-known and generally comprise a filtration vessel comprising an inlet aperture connected to the supply of fluid and an outlet aperture connected to a tap or device using the filtered fluid. Contained within the filtration vessel, a filter medium is generally provided that is sealingly interposed between the inlet aperture and outlet aperture in a manner that only allows fluid to flow out through the outlet aperture once it has passed through the filtration medium.

Various filtration media can be used depending on the size and chemistry of the impurities that need to be removed from the fluid/water supply. In fact, the filter system may comprise a series of filters that successively filter out different sizes and/or types of impurities. Such, so-called multi-stage filters can be contained in a single unit, or a series of filters can be used sequentially in a given fluid/water supply.

Known filtration media include resins, scrims, reticulated sheets, porous membranes and indeed porous block media, such as compressed activated carbon blocks.

In use, filters need to be replaced periodically once the filter medium has become clogged with filtered-out impurities, or where there is a risk of biological growth over extended periods of time. For the sake of convenience, and to reduce the likelihood of incorrect servicing, it has become customary for the filter vessel and filter medium to be formed as a single disposable filter cartridge that can be clipped into and out of the supply. Such known cartridges generally comprise proprietary connectors that prevent, or reduce the likelihood of, incorrect installation thereby reducing the likelihood of contaminating the fluid or water supply, e.g. by fitting a filter with the inlet and outlet apertures reversed.

A major drawback of known disposable filter cartridges is the fact that they are comprised of various materials, e.g. a plastics vessel, rubber seals, a carbon block etc., which can make recycling of the cartridges at the end of their useful life difficult and costly. It has been proposed to replace only the filter medium, rather than the entire canister, to alleviate this problem but this solution has not been well-received owing to the fact that the remaining parts of the filter cartridge need to be thoroughly cleaned and reassembled before they can be put back into service. Moreover, a factory-sealed unit, rather than one that requires end-user intervention, is generally considered to be less susceptible to incorrect assembly, and can be monitored and/or checked at each stage of the manufacture, transport, installation and disposal cycle.

SUMMARY

It is an object of the present invention to address one or more of the above problems and to provide an alternative and/ore improved fluid/water filter system. According to a first aspect of the invention, there is provided a filter insert comprising: a body portion and a closed-ended tube, an open end of which is sealingly affixed around the periphery of the body portion; an inlet aperture and an outlet aperture each aperture communicating via a through hole in the body portion with the interior of the tube; a filter medium located within the tube and being sealingly interposed between the inlet aperture and the outlet aperture, wherein the tube is at least partially manufactured of a flexible plastics material, and wherein the body portion is relatively rigid.

A reinforcing plate may be provided to support the upper surface of the housing and to inhibit/prevent its deformation under the effects of mains water pressure. The reinforcing plate may comprise a removable metal disc that sits on top of the housing, and which is interposed, in use, between the housing and a connector to which the filter is affixable.

The relatively flexible hollow body portion may comprise a bag manufactured of plastics film. The plastics film may be provided with a metallised surface coating on one or both sides thereof, which can inhibit light ingress thereby reducing the likelihood of bio-film growth. The plastics film may be a sterile, FDA and/or food-grade polymer film. The plastics film preferably comprises a laminated plastics film, most preferably comprising multiple layers of polyethylene (for ease of welding to the housing), aluminium (to reduce the film's light transmissivity), polyamide, e.g. Nylon® (for strength) and polyethylene terephthalate.

According to a second aspect of the invention, there is provided a filter comprising a connector, a housing detachably affixable to the connector and a filter insert removably receivable in the housing; the connector comprising inlet and outlet apertures for connection to a fluid supply and fluid-consuming device, respectively; the filter insert comprising inlet and outlet apertures releasably and sealingly connectable to the inlet and outlet apertures of the connector, a filter medium sealingly interposed between the inlet and outlet apertures and a substantially fluid impermeable barrier surrounding the insert and being arranged to prevent the fluid from coming into contact with the housing.

According to a third aspect of the invention, there is provided a filter comprising a housing for receiving a filter insert, the filter insert comprising: a filter insert housing; an inlet aperture and an outlet aperture each aperture communicating with the interior of the filter insert housing; a filter medium located within the filter insert housing and being sealingly interposed between the inlet aperture and the outlet aperture, wherein the filter insert housing is at least partially manufactured of a flexible material, the filter additionally comprising a connector that is releasably connectable to the housing, the connector comprising inlet and outlet spigots for connection to a water supply and water outlet, respectively, the inlet and outlet spigots of the connector being sealingly connectable to the inlet and outlet apertures of the filter insert, respectively.

In a preferred embodiment of the invention, the radial clearance between the exterior surface of the filter insert housing and the interior surface of the filter housing is less than 1 mm, more preferably less than 0.5 mm, and most preferably less than 0.25 mm. By reducing the clearance between the filter insert and the housing, the amount of deformation and/or movement of the plastics film can be reduced. In particular, where the supply pressure is variable over time, the flexible plastics can inflate and deflate slightly, which can cause fatigue damage. Furthermore, extended period of strain/deformation can lead to creep or permanent set in the plastics film, thereby potentially reducing its longevity, in particular the longevity of any joins/welds therein. Thus, by reducing the radial clearance between the filter insert and the housing, the amount of strain in the plastics film can be reduced. The filter medium may comprise a tube manufactured of a porous material, such as compressed and/or sintered activated carbon and/or resin. The flow of fluid from the inlet aperture to the outlet aperture of the filter insert is preferably arranged to be radially inwardly from the exterior of the tube towards the interior of the tube. Such a configuration is believed to provide improved filtration and longevity of the filter medium because the surface area of the exterior surface of the tube, where a greater proportion of the filtered-out contaminants build up, is greater than that of its interior surface, where a much lesser proportion of the filtered-out contaminants accumulate, or where there are no filtered-out contaminants. The tubular filter medium is preferably blocked off at one end to prevent fluid from bypassing the porous body of the filter medium. The end of tubular filter medium may be blocked off using a blanking plate that has been affixed (e.g. glued) to the end of the tube, and/or the filter medium may comprise a cylindrical block of porous material comprising an axial blind hole.

The filter insert is preferably contained, in use, within a relatively rigid housing. A relatively rigid housing, where provided, may comprise a relatively rigid, hollow body into which the filter insert is axially receivable. The relatively rigid housing preferably comprises engagement means for locating and engaging the filter medium of the filter insert. Such engagement/location means may comprise ribs or bosses that engage the filter medium. Advantageously, the engagement/location means may serve to support and/or reinforce the filter medium, which can often be relatively fragile and/or frangible, against shocks and impact forces that can occur during handling and/or transportation of the filter.

The connector and housing are preferably inter-engageable using a bayonet-type connector: the housing comprising a plurality of lugs that are slideably receivable within apertures of the connector, or vice-versa. The lugs, where provided, are preferably engageable with an engaging surface such that, after insertion of the lugs into the apertures, relative rotation of the housing and connector causes the housing to seat tightly against the connector.

According to a fourth aspect of the invention, there is provided a filter comprising a housing, a connector and a part-turn locking mechanism for releasably locking the housing to the connector, the part-turn locking mechanism comprising: a first locking position in which the housing is locked to, and in contact with, the connector; a second locking position in which the housing is engaged with the connector, but axially spaced apart therefrom; and a third unlocked position in which the housing is unlocked from the connector.

According to a fifth aspect of the invention, there is provided a filter comprising a connector, a housing detachably affixable to the connector and a locking collar for releasably locking the housing to the connector, one of the housing, connector and collar comprising a lug adapted to engage with an engagement surface of another one of the housing, connector and collar, the engagement surface comprising a first flat portion and an inclined portion, wherein relative rotation of the collar and connector in a first direction causes the lug to slide over the first flat portion, thereby inhibiting axial separation of the housing and connector, and then over the inclined portion, thereby displacing the housing axially towards the connector, and wherein relative rotation of the collar and connector in a second direction opposite to the first direction causes the lug to slide over the inclined portion, thereby allowing the housing to be displaced axially away from the connector, and then over the first flat portion thereby inhibiting axial separation of the housing and connector.

The filter may further comprise an aperture in the first flat portion, the aperture being located at a radially spaced apart position from the inclined portion and being larger than the lug to allow the lug to pass therethrough thereby permitting separation of the housing from the connector when the collar is rotated by a predetermined amount in the second direction.

The engagement surface may comprises a second flat portion located on the opposite side of the inclined portion to the first flat portion.

A plurality of lugs engageable with a plurality of engagement surfaces may be provided, each engagement surface comprising a first flat portion, an inclined portion, and optionally, a second flat portion.

The lugs may be unequally spaced at different radial positions and at least two of the plurality of lugs may be differently shaped.

The filter insert may comprise at least one spigot axially engageable with at least one corresponding flow control valve of the connector, the flow control valve or valves being openable upon axial displacement of the spigot or spigots towards the flow control valve and closeable upon axial displacement of the spigot or spigots away from the flow control valve or valves.

The engaging surface preferably comprises an inclined portion so that relative rotation of the housing and connector causes the housing to be displaced axially towards, or away from, the connector depending on the direction of rotation.

Preferably, the engaging surface further comprises one or more flat portions, i.e. portions that do not cause axial displacement of the housing relative to the connector upon rotation thereof. Preferably, a flat portion is provided on either side of the inclined portion.

One advantage of providing an engagement surface comprising at least one flat and at least on inclined portion is that blow-off of the housing can be prevented. In other words, the housing can be rotated, e.g. counter-clockwise, to unseat the seals, and close the valves, of the filter with respect to the connector. Under the effect of mains water pressure, there would ordinarily be a tendency for the filter to be blown-off the connector. However, the flat portions of the engagement surface are preferably configured to substantially restrain axial movement of the housing away from the connector until the valves have been completely closed-off. The housing may be safely removable, without any water pressure being exerted, by further rotating the housing relative to the connector until the lugs align with the apertures, whereupon, it becomes possible to disconnect the housing from the connector.

BRIEF DESCRIPTION OF THE DRAWINGS

Preferred embodiments of the invention shall now be described, by way of example only, with reference to the accompanying drawings in which.

DETAILED DESCRIPTION

Figure 1:
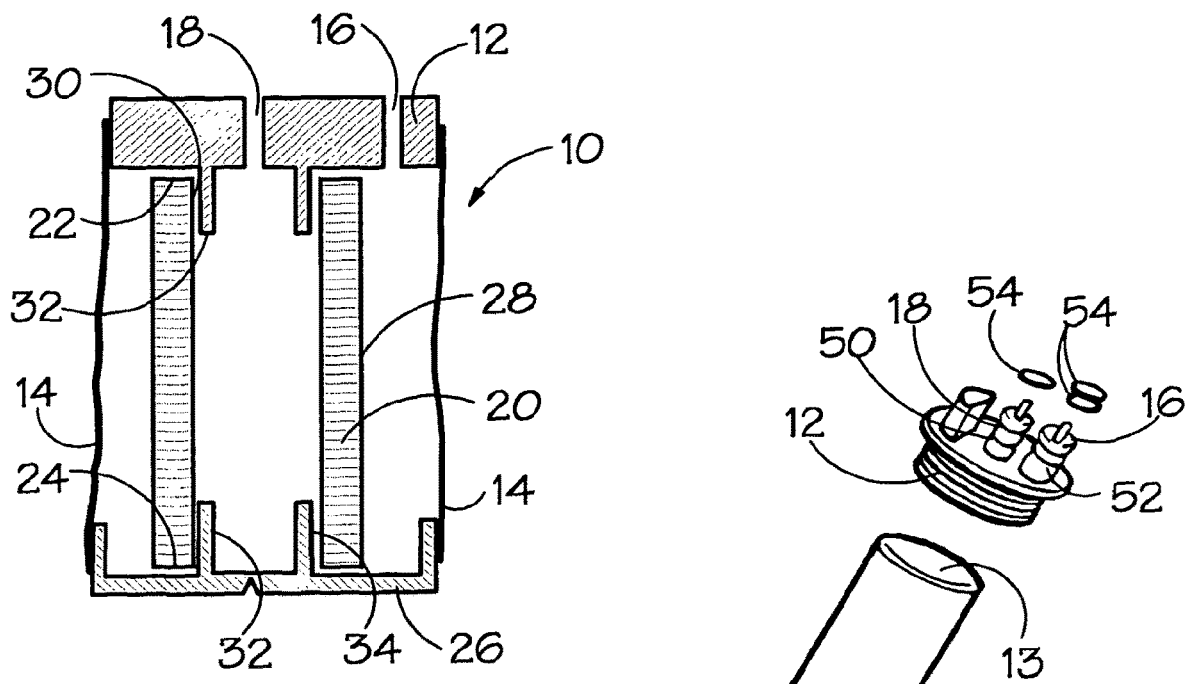
FIG. 1 is schematic longitudinal cross-section of a filter insert in accordance with the invention.

In FIG. 1, a filter insert 10, in this case a water filter insert, comprises a mounting disc 12 and a flexible plastics tube 14 whose upper end is sealingly affixed around the periphery of the mounting disc 12. The flexible plastics tube comprises a multiple, e.g. three or more layers of plastics and/or metal foil. In a preferred embodiment of the invention the flexible plastics tube 14 is sealingly affixed around the periphery of the mounting disc 12 using a thermal bonding process whereby the inner layer plastics tube 14 is melted/fused to the LDPE of the mounting disc 12. Additionally or alternatively, a bead of thermoplastic glue may be used to provide a sealing connection between the tube 14 and disc 12. The lower end of the flexible plastics tube 14 is similarly sealingly affixed around the periphery of a closed-ended, cylindrical closure member 26 using a similar thermal bonding process and/or a bead of thermoplastic glue.

The mounting disc 12 has two through holes, which form the inlet 16 and outlet apertures 18 of the filter insert 10, for connection to a mains water supply (not shown) and a tap (not shown), respectively. In use, water flows from the mains supply into the interior of the flexible tube 14 via the inlet aperture 16, and out of the filter insert 10 through the outlet aperture 18 as shown by the flow arrows.

A porous, tubular filter element 20 is provided within the flexible tube 14. The tubular filter element 20 has square-cut ends, which provide annular surfaces 22, 24 for sealing to the underside of the mounting disc 12 and the flat, interior end wall of the closure member 26, respectively, using beads of thermoplastic glue.

In the present example, the underside of the mounting disc 12 and the closure member 26 each comprise cylindrical spigot portions 32 whose outer surfaces 34 are an interference fit with the interior surface 30 of the filter element 20, and which are provided with outwardly projecting helical thread portions. Such a configuration permits the filter element 20 to be sealingly push-fitted, and/or screw-threadingly engaged (i.e. whereby the helical threads cut into the filter element), onto the spigots to form a seal, rather than, or in addition to, the use of a bead of thermoplastic glue.

Thus, the filter element 20 is sealingly interposed between the inlet 16 and outlet apertures 18 in such a manner that water must pass through the pores of the filter element 20, and thus be filtered thereby, as it flows from the water supply to the tap. It will be noted that by locating the inlet aperture 16 radially outwardly of the outer surface 28 of the filter element 20 and the outlet aperture 18 radially inwardly of the inner surface 30 of the filter element 20, the direction of water flow is generally radially inwardly, which is believed to be best practice.

Figure 2:
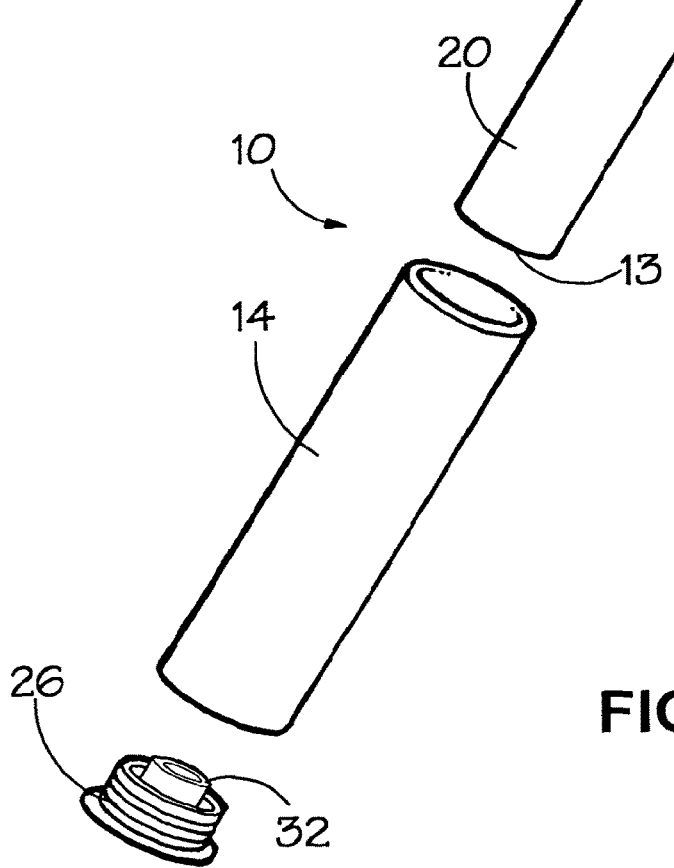
FIG. 2 is an exploded, perspective view of a filter insert in accordance with the invention.

FIG. 2 shows how the filter insert 10 of FIG. 1 is assembled by the steps of: inserting the filter element 20 into a pre-cut length of flexible plastics tubing 14; push fitting the spigots 32 of the mounting disc 12 and closure member 26 into the ends of the tubular filter element 20; and gluing the interior surfaces of the upper and lower edges 13 of the flexible tube 14 around the outer peripheries of the mounting disc 12 and closure member 26. Such an operation can be readily automated, or carried out manually.

The inlet 16 and outlet apertures 18 communicate with spigots 50, 52 that extend axially outwardly from the upper surface of the mounting disc 12. Each spigot 50, 52 has a pair of circumferential grooves for receiving an o-ring seal 54, whose function shall be described in greater detail below.

Whilst under certain circumstances, it might be possible to use the filter element in isolation, it is probable that the use of the filter element 10 by itself, in a water supply having a moderate to high water pressure, might cause the flexible plastics tube 14 to distend outwardly or burst. As such, additional reinforcement may be needed to counteract this problem, and a relatively rigid outer casing or housing may therefore be provided for the filter insert 10. An example of such an outer casing or housing is shown in FIGS. 3 to 7.

Figure 3:
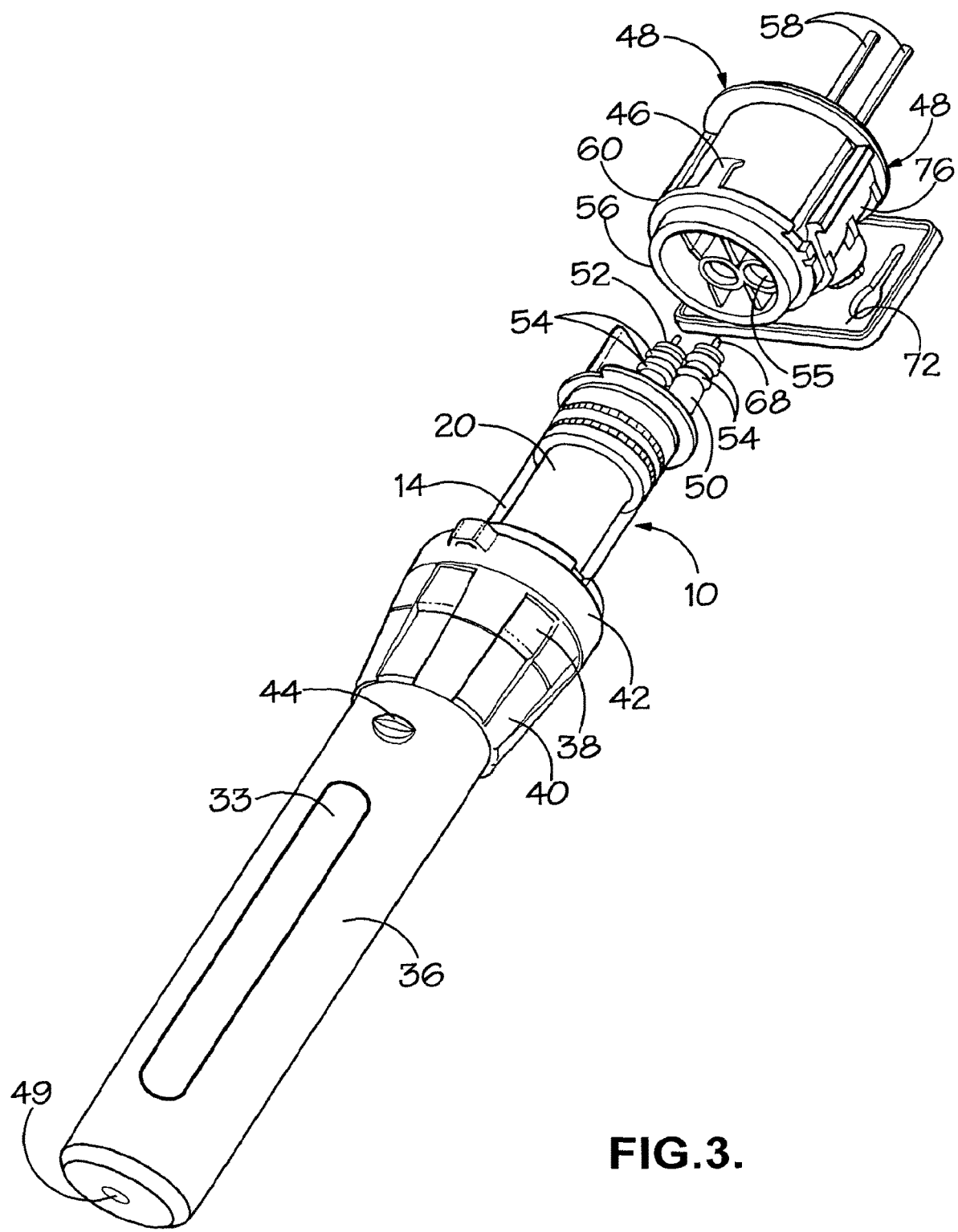
FIG. 3 is an exploded, perspective view of a filter system for receiving the filter insert of FIG. 1.

In FIG. 3, it can be seen that the filter insert 10 is slidingly receivable within the interior of a closed-ended, relatively rigid plastics housing 36. The housing 36 comprises, at its open end, a radially outwardly projecting flange portion 38 that provides a laterally extending abutment surface 40 for a locking collar 42 to engage with. The locking collar 42 is slidingly receivable over the closed end of the housing 36 and is able to resiliently deform so as to slide over and past a pair of diametrically opposed barbs 44 integrally formed with the outer surface of the housing 36 approximately one third of the way along its length. However, owing to the shape of the barbs 44, once the collar 42 has slid past the barbs 44, it is not easily able to slide back off the end of the housing 36.

The interior surface of the open end of the housing 36 and the interior surface of the locking collar 42 have formations therein that engage with complimentarily-shaped engagement formations 46 located on the outer surface a connector 48, which shall be described in detail below. The engagement formations 46 are unequally spaced at radial positions around the periphery of the connector 48 so that the housing 36 and locking collar 42 can only engage with the engagement formations 46 when they have a particular relative rotational orientation. This asymmetry reduces the likelihood of the housing being incorrectly connected to the connector 48.

The interior of the base wall of the housing 36 carries an axially projecting pin formation 49 that engages a complimentarily shaped and located indentation located on the underside of the end cap 26 of the filter element 10. The pin 49 enables the housing to support the filter medium, which can reduce the likelihood of it breaking during transportation or use.

Figure 4:
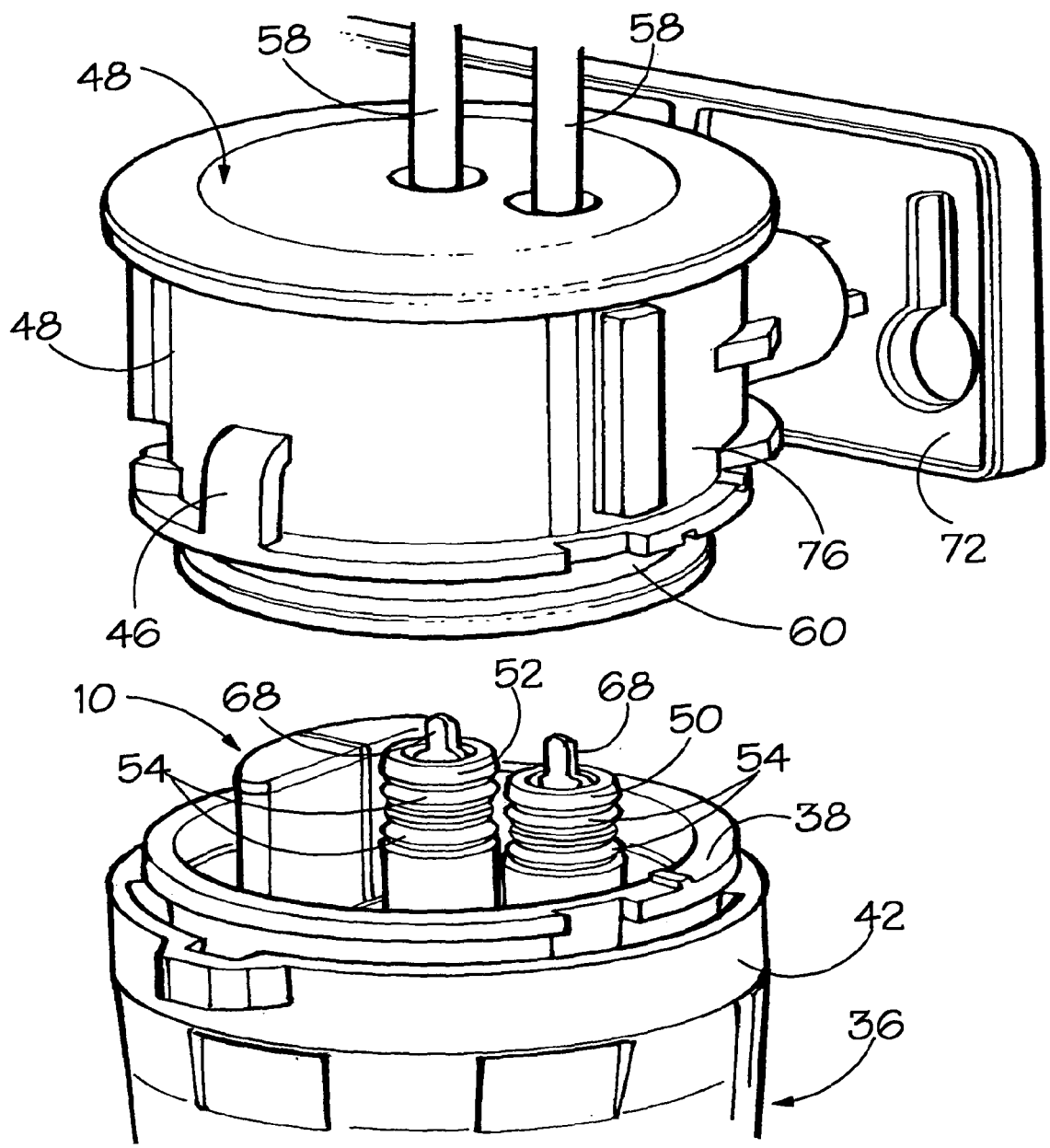
FIG. 4 is a close-up, perspective view of a first embodiment of a connector for the filter system.
Figure 5:
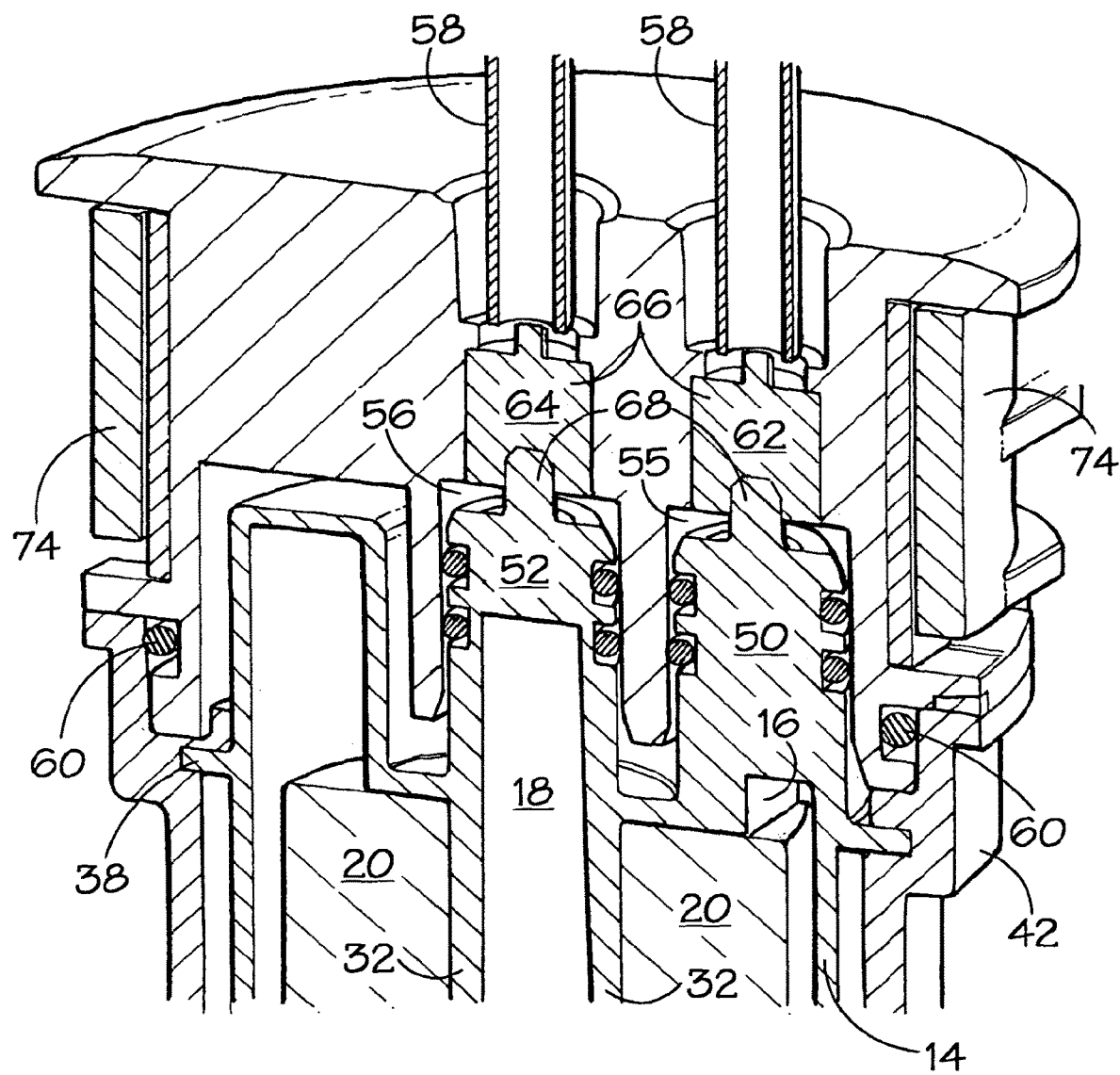
FIG. 5 is a lateral cross-sectional view through the connector of FIG. 4.

As can be seen in FIGS. 4 and 5, the interior of the connector 48 comprises a pair of connector tubes 55, 56 whose longitudinal axes are substantially parallel to the longitudinal axis of the filter insert 10 and housing 36, and whose interior sidewalls seal against the o-ring seals 54 of the filter insert's spigots 50, 52. The connector tubes 55, 56 communicate with the mains water supply (not shown) and a tap (not shown), respectively, via conventionally plumbed-in pipe work 58. Thus, the filter insert 10 can be sealingly connected to the mains water supply and the tap via the connector tubes 54, 56 and spigots 50, 52 respectively.

Notably, the interior of the housing 36 does not come into contact with the water at any time since the only flow path is from the mains supply, through the inlet connector tube 55, through the inlet spigot 50 and into the flexible tube 14, through the filter medium 20, through the outlet spigot 52, into the outlet connector tube 56 and then back into the pipe work 48. The need for any seal between the connector 48 and the housing 36 is therefore removed, although it will be seen that a supplementary o-ring seal 60 has been provided, nevertheless to keep out dust and/or to safeguard the premises in the event that there is a leak in the filter insert 10.

Turning now to FIG. 5, it can be seen that each of the connector tubes 55, 56 is provided with a flow-control valve 62, 64. The purpose of the flow control valves is to shut-off the mains supply and tap when the filter insert 10 is removed from the connector 48. The flow control valves 62, 64 each comprise a floating seal 66 that is captured and slideably moveable within a portion of the connector tubes 55, 56. The floating seals 66 can be moved axially within the connector tube by the pressure of water or by the force exerted by a nipple 68 extending axially outwardly from the free end of each of the filter insert's spigots 50, 52. When no filter insert 10 is present, the mains water pressure and the pressure of the water in the tap supply pipe forces the floating seals 66 to form a seal thereby closing off the respective pipe work. However, when the filter element 10 is correctly inserted and pushed home, the floating seals 66 move out of sealing engagement to permit water to flow into and out of the filter element 10. Thus, the provision of in-line valves helps to prevent contamination of the water supply and to facilitate connection and disconnection of the filter element 10 by automatically shutting-off and opening the supply and drain pipes. Such a configuration also prevents the water from being used when there is no filter element present, e.g. if the housing 36 were to be connected to the connector, but without a filter element being present.

Additionally, the housing 36 is preferably manufactured from a transparent material, or is preferably provided with a viewing window 33 so that the filter element 10 can be visually inspected without having to remove the housing 36. Thus, various indicia can be provided on the filter element 10, e.g. an installation date, replacement date, filter property data, etc., which indicia can be visually inspected without having to disassemble the filter system.

It will also be noted that the outlet spigot 52 of the filter element 10 is coaxial with the longitudinal axis of the filter insert 10, whereas the inlet spigot 50 is positioned off-centre with respect to the longitudinal axis of the filter insert 10. Such an asymmetric configuration prevents the supply pipe from being inadvertently connected to the filter element's outlet aperture and vice-versa.

Figure 6:
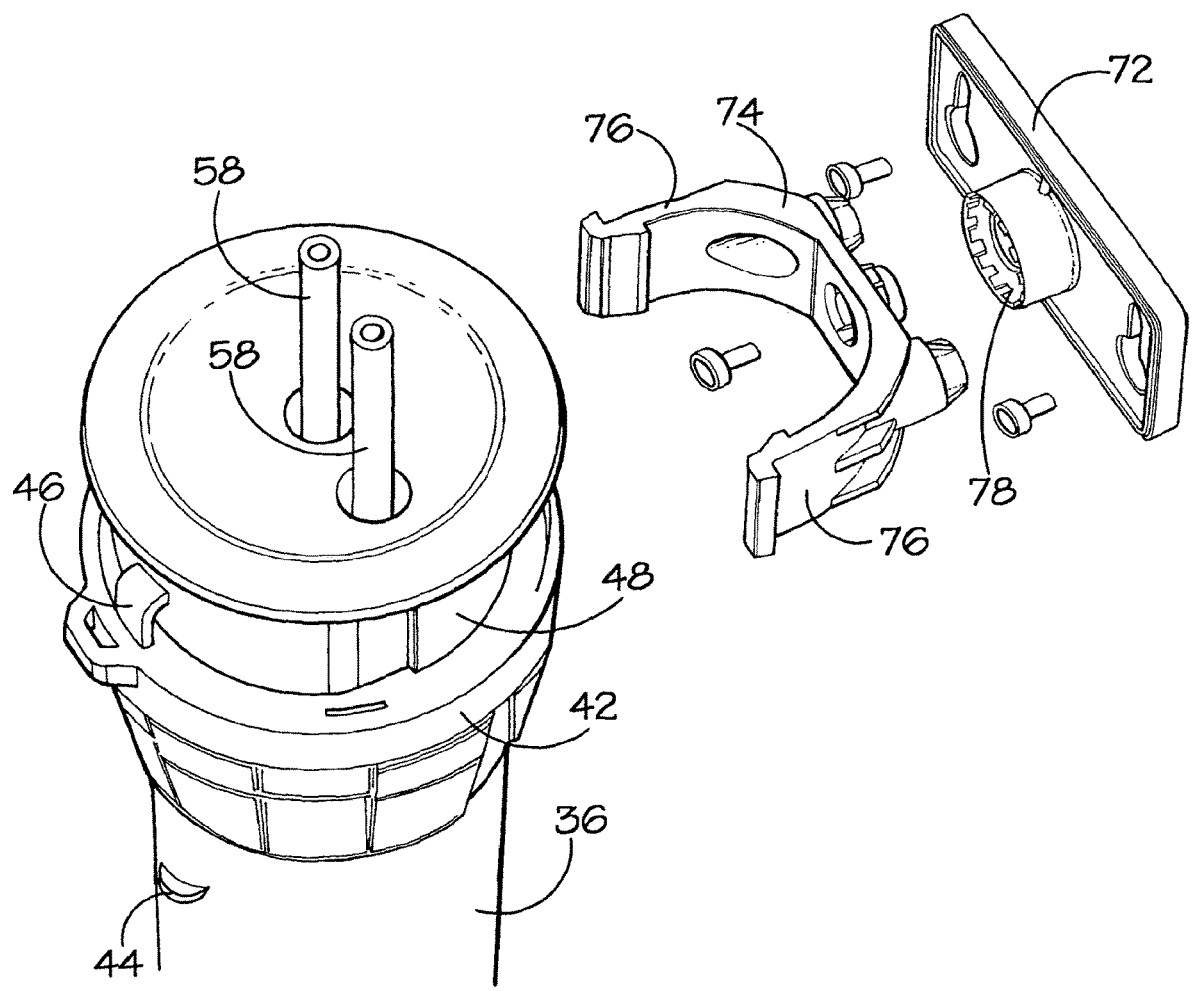
FIG. 6 is an exploded view of a mounting clip for the filter system of the invention.
Figure 7:
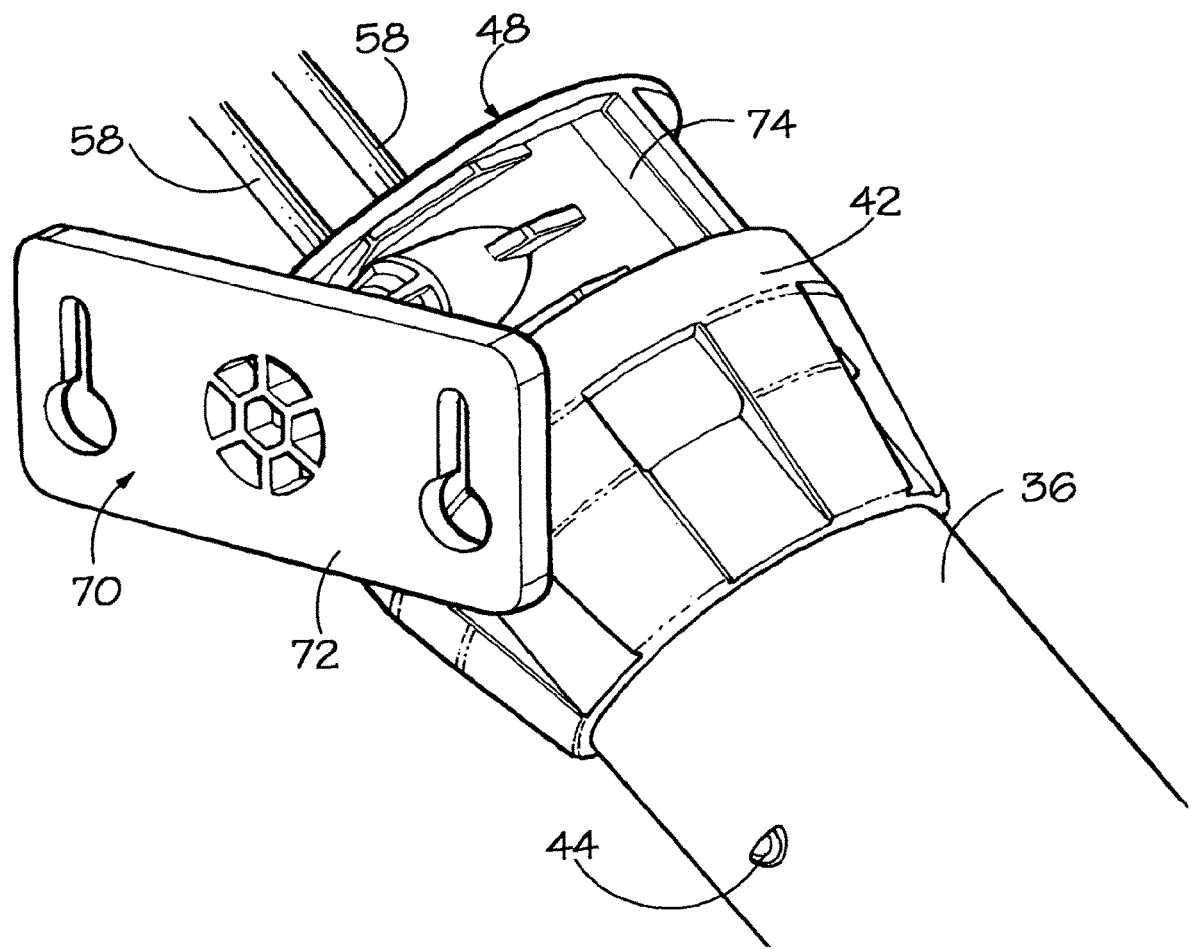
FIG. 7 is a rear perspective view of the filter system clipped to the mounting clip of FIG. 6.

FIGS. 6 and 7 show how the connector 48 can be secured to a wall or other mounting surface using a clip 70. The clip comprises a main body portion 72 that can be secured to the mounting surface using screws and/or an adhesive and/or a self-adhesive strip, and a generally U-shaped clip 74 whose resiliently deformable arms 76 are resiliently deformable into engagement with the exterior wall of the connector 48. The connector 48 can therefore be push-fitted into engagement with the clip 70 to secure the entire filter system in place. The U-shaped clip 74 is rotatable relative to the main body portion 72 of the clip to permit the filter to be installed at a variety of angles, which can be useful where space is restricted. The connection between the main body portion 72 and the U-shaped clip 74 comprises a castellated portion 78 so that the relative rotation can be fixed at a desired angle.

FIGS. 8 to 13 show an alternate embodiment of the invention similar to that described above. Identical reference signs have been used to identify identical features.

Figure 8:
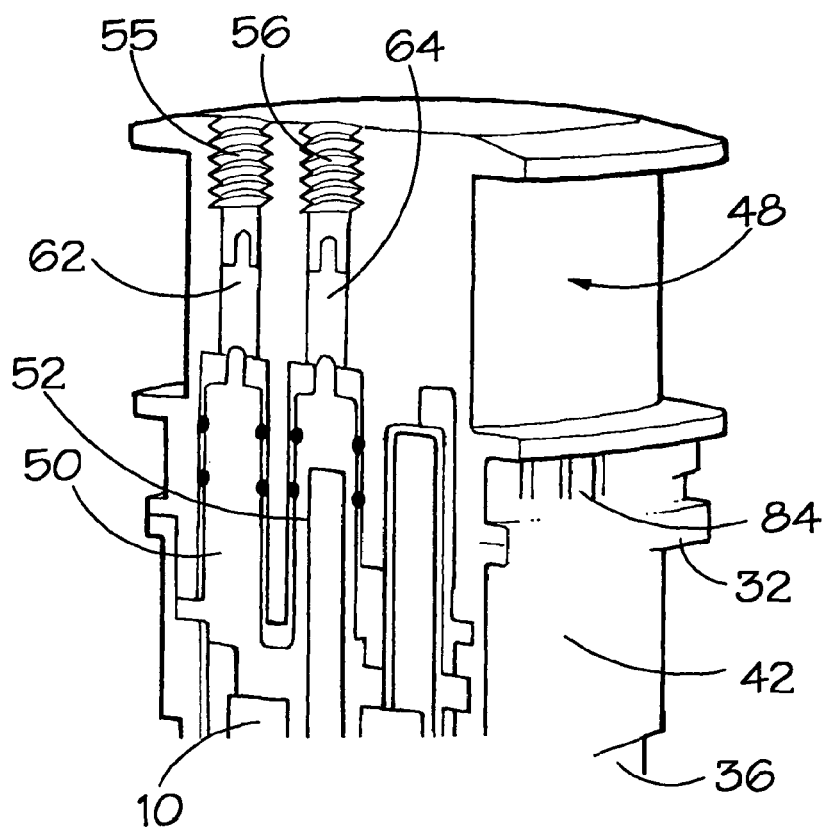
FIG. 8 is a perspective view of a second embodiment of a connector for the filter system in a first position.
Figure 9:
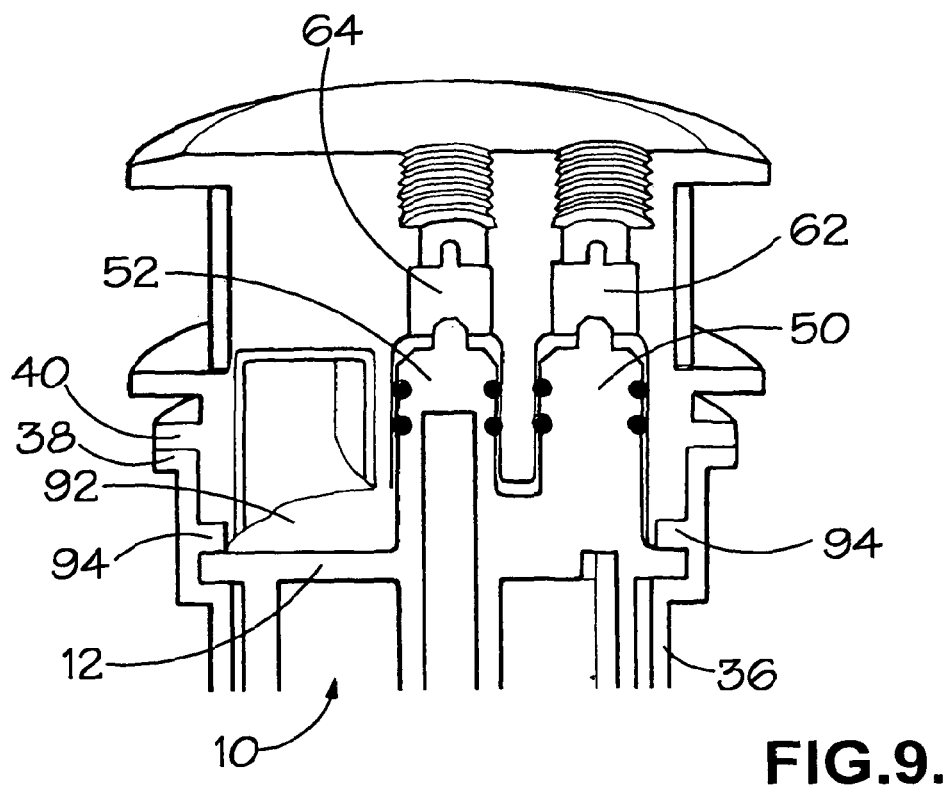
FIG. 9 is a perspective view of a third embodiment of a connector for the filter system in a second position.

In FIGS. 8 and 9, it can be seen that the filter insert 10 is slideably receivable within the housing 36 as previously described, and that the filter insert spigots 50, 52 cooperate with the connector tubes 55, 56 attached to the connector 48 in the same way as described previously. However, it will be noted that the configuration of the locking collar 42 is slightly different, as follows:

In the same manner as previously described, the housing 36 comprises, at its open end, a radially outwardly projecting flange portion 38 that provides a laterally extending abutment surface 40 for a locking collar 42 to engage with.

The locking collar 42 has four radially inwardly projecting lugs 80 that engage with complimentarily-shaped apertures 82 located on the outer surface the connector 48. The lugs 80 are unequally spaced at radial positions around the periphery of the connector and are differently shaped so that the housing 36 and locking collar 42 can only engage with the lugs 80 when they have a particular relative rotational orientation. This asymmetry reduces the likelihood of the housing 36 being incorrectly connected to the connector 48.

The locking collar 42 can be slid axially towards the connector 48 such that the lugs 80 pass through the apertures 82 as shown in FIG. 8. The locking collar 42 can then be rotated relative to the housing 48, whereupon a surface of each of the lugs 80 engages a corresponding engagement surfaces 84. The engagement surfaces 84 each have a first flat portion 86 leading to an inclined portion 88, which leads in turn to a second flat portion 90. Once the locking collar 42 has been fully rotated, the housing 36 is locked to the connector 48 as shown in FIG. 9.

During rotation of the locking collar 42, a number of things happen, as shown in FIGS. 10 to 13.

Figure 10:
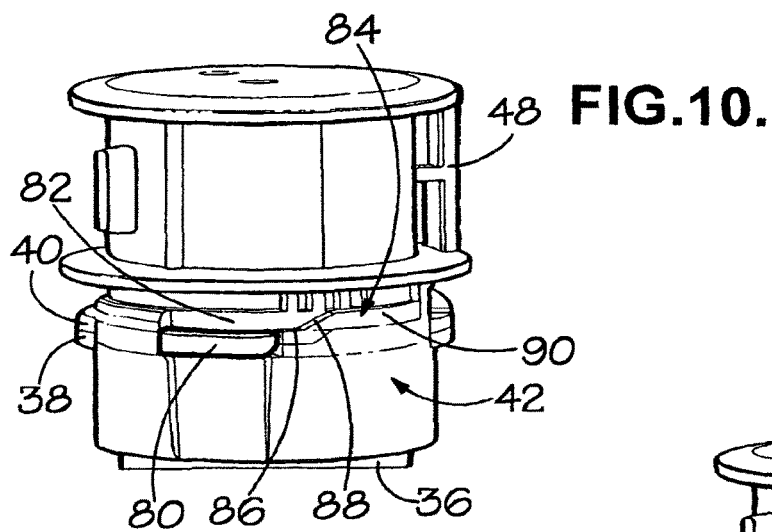
FIGS. 10 to 13 are a sequence of drawings showing the operation of the connector shown in FIGS. 8 and 9.

In FIG. 10, the housing 36 is offered up to the connector 48 and the lugs 80 of the locking collar 42 aligned with the apertures 82. In this position, no water can flow into or out of the filter because the flow control valves 62, 64 are both shut off.

Figure 11:
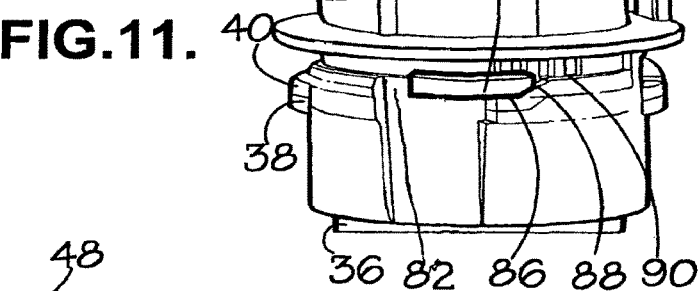

In FIG. 11, the locking collar 42 has been rotated such that the lugs 80 engage the first flat portion 86 of the engagement surfaces 84. In this position, it is not possible to separate the housing 36 from the connector 48, and the flow control valves 62, 64 remain closed.

Figure 12:
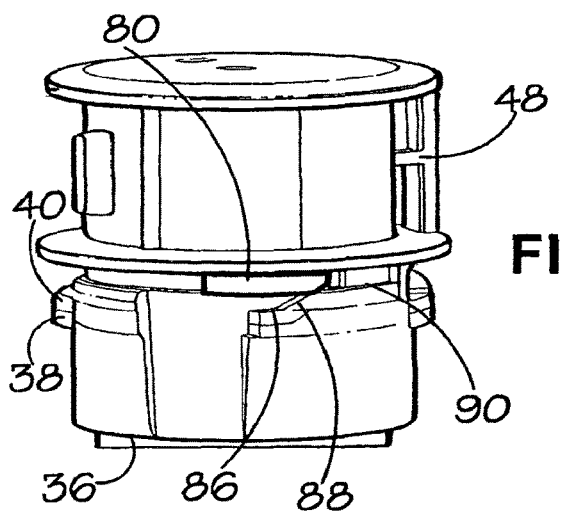

Upon further rotation of the locking collar 42, as shown in FIGS. 11 and 12, the lugs 80 slide up and over the inclined portions 88 of the engagement surfaces 80 causing the housing 36 to be displaced axially towards the connector 48. The relative axial displacement of the housing and connector causes the spigots to engage the flow control valves 62, 64, thereby opening them and allowing water to flow into and out of the filter.

Figure 13:
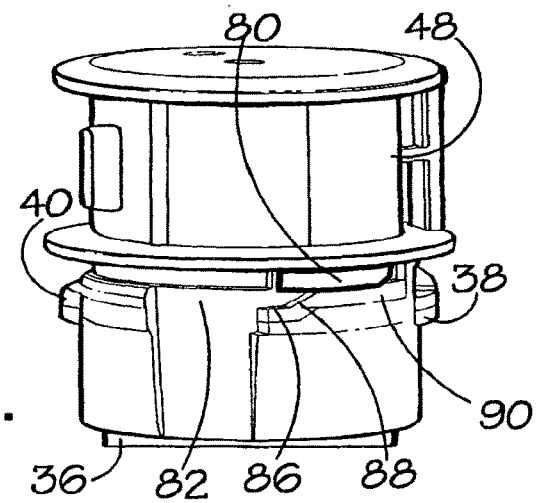

Finally, as shown in FIG. 13, the locking collar 42 has been moved to a rotary stop position (i.e. the lugs 80 slide along the second flat portion 90) completely locking the assembly together.

Disconnection of the housing 36 from the connector 48 can be accomplished by following the above steps in reverse. It will be apparent that the first flat portion 86 prevents the housing 36 from blowing off the connector 48 as the water/air pressure within the filter cartridge is released.

FIG. 9 shows a yet further optional modification to the invention in which the upper surface of the mounting disc 12 of the filter insert 10 is supported by a removable metal reinforcing disc 92. The reinforcing disc 92 is placed on top of the mounting disc 12 and is clamped, in use, between the mounting disc 12 and an inwardly projecting flange portion 94 of the connector 48. The reinforcing disc 92 prevents the mounting disc from bowing or deforming under the pressure of the fluid contained within the filter insert 10, thereby potentially un-seating any of the O-ring seals and/or flow control valves.

The invention is not limited to the details of the foregoing embodiments, for example, the shape, dimensions and materials of manufacture of some or all of the elements thereof may be altered. Furthermore, although the invention has been described it the context of water filters, it is not restricted to water filters: it could be used for filtering any fluid, for example, non-potable water, blood and other body fluids, paint, chemicals, liquid and/or gaseous fuels.

What is claimed is:

1. A filter comprising:
a connector comprising an inlet tube for connection to a supply of fluid and an outlet tube for connection to a fluid-consuming device;
a housing detachably affixable to the connector;
a filter insert removably receivable in the housing, the filter insert comprising:
a body portion and a closed-ended tube, an open end of which is sealingly affixed around the periphery of the body portion,
an inlet aperture and an outlet aperture, each aperture communicating via a through hole in the body portion with the interior of the closed-ended tube, the inlet and outlet apertures of the filter insert being releasably and sealingly connectable to the inlet and outlet tubes of the connector, and
a filter medium located within the closed-ended tube and being sealingly interposed between the inlet aperture and the outlet aperture of the filter insert, wherein the closed-ended tube comprises an impermeable barrier and is at least partially manufactured of a flexible plastics material, and wherein the body portion is rigid relative to the closed-ended tube; and
a substantially fluid impermeable barrier surrounding the filter insert and being arranged to prevent fluid from coming into contact with the housing.

2. The filter of claim 1 wherein:
the substantially fluid impermeable barrier is flexible and the housing is rigid and is arranged to mechanically support the substantially fluid impermeable barrier;
a radial clearance between an exterior of the filter insert and an interior of the housing is any one or more of the group comprising: less than 1 mm, less than 0.5 mm, and less than 0.25 mm;
the filter further comprises a locking collar for releasably locking the housing to the connector;
wherein the interior of the housing comprises engagement means for engaging and/or supporting the filter medium of the filter insert; and/or
the filter further comprises a flow control valve associated with one or both of the inlet and outlet apertures of the filter insert.

3. The filter of claim 2 wherein the filter further comprises a locking collar for releasably locking the housing to the connector and wherein the locking collar comprises a lug adapted to engage with an engagement surface of the housing or the connector, the engagement surface comprising a first flat portion and an inclined portion, wherein relative rotation of the locking collar and connector in a first direction causes the lug to slide over the first flat portion, thereby inhibiting axial separation of the housing and connector, and then over the inclined portion, thereby displacing the housing axially towards the connector, and wherein relative rotation of the locking collar and connector in a second direction opposite to the first direction causes the lug to slide over the inclined portion, thereby allowing the housing to be displaced axially away from the connector, and then over the first flat portion thereby inhibiting axial separation of the housing and connector.

4. The filter of claim 1, further comprising an o-ring seal interposed between the connector and the housing.

5. The filter of claim 1 wherein the housing comprises a transparent portion.

6. The filter of claim 1, further comprising a part-turn locking mechanism for releasably locking the housing to the connector, the part-turn locking mechanism comprising:
a first position in which the housing is locked to the connector;
a second position in which the housing is retained to the connector but capable of limited axial movement relative to it; and
a third unlocked position in which the housing is unlocked from the connector.

7. The filter of claim 6 wherein the part-turn locking mechanism comprises:
one or more engagement surfaces and one or more lugs, each of the one or more lugs being adapted arranged to engage and slide relative to a corresponding one of the one or more engagement surfaces, wherein at least one of the one or more engagement surfaces comprises a first flat portion, an inclined portion, and a second flat portion.

8. The filter of claim 7 wherein the part-turn locking mechanism comprises a locking collar and wherein:
the one or more engagement surfaces are positioned on at least one of the housing, the connector, or the locking collar;
at least one of the housing, the connector, and the locking collar includes at least one of the one or more lugs, wherein, for each of the one or more lugs and corresponding one or more engagement surfaces, relative rotation of the locking collar and connector in a first direction causes the lug to slide over the first flat portion, thereby inhibiting axial separation of the housing and connector, and then over the inclined portion, thereby displacing the housing axially towards the connector, and wherein relative rotation of the locking collar and connector in a second direction opposite to the first direction causes the lug to slide over the inclined portion, thereby allowing the housing to be displaced axially away from the connector, and then over the first flat portion thereby inhibiting axial separation of the housing and connector.

9. The filter of claim 8 wherein:

at least one of the one or more engagement surfaces further includes an aperture in the first flat portion, the aperture being located at a radially spaced apart position from the inclined portion and being larger than the corresponding lug to allow the corresponding lug to pass therethrough, thereby permitting separation of the housing from the connector when the collar is rotated by a predetermined amount in the second direction; and/or wherein, in at least one of the one or more engagement surfaces, the second flat portion is located on the opposite side of the inclined portion to the first flat portion.

10. The filter of claim 8 wherein the filter insert further comprises a spigot axially engageable with a flow control valve of the connector, the flow control valve being openable upon axial displacement of the spigot towards the flow control valve and closeable upon axial displacement of the spigot away from the flow control valve.

11. The filter of claim 7 wherein the one or more lugs comprise a plurality of lugs that are unequally spaced at different radial positions and/or comprise at least two lugs that are differently shaped.

12. The filter of claim 1, further comprising a clip comprising releasable securement means for releasably securing the connector to a surface.

13. The filter of claim 12 wherein the means for releasably securing comprises a generally U-shaped clip having resiliently deformable arms which are resiliently deformable into engagement with an exterior wall of the connector.

* * * * *